(12) United States Patent
Itonaga

(10) Patent No.: US 7,233,562 B2
(45) Date of Patent: Jun. 19, 2007

(54) OPTICAL PICKUP DEVICE

(75) Inventor: Makoto Itonaga, Yokohama (JP)

(73) Assignee: Victor Company of Japan, Limited, Yokohama (JP)

( * ) Notice: Subject to any disclaimer, the term of this patent is extended or adjusted under 35 U.S.C. 154(b) by 560 days.

(21) Appl. No.: 10/892,382

(22) Filed: Jul. 16, 2004

(65) Prior Publication Data

US 2005/0018585 A1  Jan. 27, 2005

(30) Foreign Application Priority Data

Jul. 25, 2003  (JP) ............................ P2003-279977

(51) Int. Cl.
*G11B 7/00* (2006.01)
(52) U.S. Cl. ............................... 369/112.01
(58) Field of Classification Search ............ 369/44.23, 369/44.24, 44.37, 112.01, 112.23, 112.08, 369/112.2
See application file for complete search history.

(56) References Cited

U.S. PATENT DOCUMENTS 7,120,109 B1 * 10/2006 Kim et al. ............. 369/112.24

OTHER PUBLICATIONS

Itonaga, M. et al. "Investigation of the General Design Principle of a Single Lens and the Development of a New NA=0.85 Single Lens", Jpn. J. Appl. Phys., vol. 42 pp. 875-879, 2003.
Lee, M. et al. "Thoroughly dissecting techniques of a next generation optical disc (second one) How to produce a Blu-ray Disc", Nikkei Electronics, vol 03/05/12 pp. 119-133, 2003. ABSTRACT.

* cited by examiner

*Primary Examiner*—Nabil Hindi
(74) *Attorney, Agent, or Firm*—The Nath Law Group; Jerald L. Meyer; Stanley N. Protigal

(57) ABSTRACT

When an extra-high density optical disc, a DVD having a recording density lower than that of the extra-high density optical disc, a CD having a recording density lower than that of the DVD, and a combined optical recording medium in which the extra-high density optical disc, DVD, and CD are appropriately combined and integrally stacked are selectively recorded or reproduced by an objective lens whose numerical aperture (NA) is set to 0.75 or more, the objective lens satisfies the following expression:

$$t < a \cdot f + b$$

wherein t: an axial thickness of the objective lens, f: a focal distance of the objective lens, a: a coefficient, and b: a constant, and the coefficient a and the constant b satisfies that a=2.02, b=−1.94; a=2.08, b=−1.84; or a=2.11, b=−1.77.

2 Claims, 8 Drawing Sheets

MAGNIFICATION α = B/A
a IS NEGATIVE IN FIGURE.
H1, H2: MAIN POINTS ON OBJECT AND IMAGE SIDES
P: AXIAL DISTANCE BETWEEN IMAGE-SIDE MAIN POINT H2 AND SECOND SURFACE 20b OF OBJECTIVE LENS 20

OPTICAL PICKUP DEVICE

BACKGROUND OF THE INVENTION

1. Technical Field

The present invention relates to an optical pickup device in which a working distance is set corresponding to an optical recording medium having a larger substrate thickness to prevent an objective lens from colliding with each optical recording medium during selective recording or reproducing of at least two or more types of optical recording mediums having different substrate thicknesses using an objective lens with a numerical aperture (NA) of 0.75 or more.

2. Background Art

In general, disc-shaped and card-shaped optical recording mediums such as an optical disc and an optical card have been frequently used, because desired tracks are accessible at a high rate in recording information signals such as video information, sound information, and computer data in spirally or concentrically formed tracks on a transparent substrate with high density and in reproducing a recorded track.

As an optical disc constituting this type of optical recording medium, for example, a compact disc (CD), a digital versatile disc (DVD), or the like has been already on the market. In recent years, in order to further increase density of the optical disc, an extra-high density optical disc (Blu Ray Disc) has been well developed, which is capable of recording or reproducing the information signals at an extra-high density as compared with the above-described CD, DVD.

First, in the CD, a laser beam formed by focusing laser light having a wavelength of about 780 nm with an objective lens having a numerical aperture (NA)=about 0.45 has heretofore been applied to a disc substrate to record or reproduce the information signal on or from a signal surface distant from a laser beam incidence surface of a disc substrate approximately by 1.2 mm.

Moreover, in the DVD, the laser beam formed by focusing the laser light having a wavelength of about 650 nm with the objective lens having a numerical aperture (NA)=about 0.6 has heretofore been applied to the disc substrate to record or reproduce the information signal on or from the signal surface distant from the laser beam incidence surface of the disc substrate approximately by 0.6 mm. In this case, a recording capacity of DVD is increased to six to eight times that of CD, and is about 4.7 gigabytes (GB) on one surface, when the disc substrate has a diameter of 12 cm.

Furthermore, the above-described extra-high density optical disc has been developed in such a manner that the laser beam obtained by focusing the laser beam having a wavelength of 450 nm or less with the objective lens having a numerical aperture (NA) of 0.75 or more is applied onto the disc substrate and that the information signals can be recorded on or reproduced from the signal surface distant from a laser beam incidence surface by about 0.05 mm to 0.15 mm. In this case, the recording capacity of one surface of the extra-high density optical disc is around 25 gigabytes (GB), when the disc substrate has a diameter of 12 cm.

Additionally, there is an optical pickup device which records or reproduces three types of optical discs having different disc substrate thicknesses to the signal surface from the laser beam incidence surface (see, for example, "Thoroughly Analyze Next Generation Optical Disc Technique (No. 2), Nikkei Electronics 2003. 5. No. 12, pp. 131 to 133).

In the "Thoroughly Analyze Next Generation Optical Disc Technique (No. 2)", as a related art of the optical pickup device which records or reproduces three types of optical discs having different disc substrate thicknesses, a double-lens system using two objective lenses (example of Samsung Electronics Co., Ltd., Korea), and a single-lens system using one objective lens (example of LG Electronics Inc., Korea) are described.

Additionally, in the double-lens system described in the document, a CD/DVD combined-use objective lens and an objective lens for Blu-ray disc are arranged on the same base. According to this example, optical adjustment peculiar to the Blu-ray disc can be performed independently with respect to a CD/DVD system. However, since both the objective lenses are controlled in a focusing direction and a tracking direction with one actuator, the weight of a movable portion of the actuator increases, and it is remarkably difficult to realize an actuator of a high band corresponding to a high transfer rate. Moreover, since two objective lenses are used, there is also a cost problem.

On the other hand, in the single-lens system described in the document, the objective lens having a single lens and a high numerical aperture (NA) of 0.85 is used in order to secure a working distance set between the objective lens and each optical disc, but any concrete numerical value example is not described with respect to each working distance for each objective lens.

SUMMARY OF THE INVENTION

There has been a demand for an optical pickup device in which a working distance is set corresponding to an optical recording medium having a larger substrate thickness in order to prevent an objective lens from colliding with each optical recording medium in selectively recording or reproducing at least two or more types of optical recording mediums having different substrate thicknesses using an objective lens having a numerical aperture (NA) of 0.75 or more.

To achieve the object, there is provided an optical pickup device which selectively records or reproduces a first optical recording medium, a second optical recording medium having a recording density lower than that of the first optical recording medium, and a third optical recording medium having a recording density lower than that of the second optical recording medium, the device comprising: a first laser light source which emits a first laser light for the first optical recording medium; a second laser light source which emits a second laser light having a wavelength longer than that of the first laser light for the second optical recording medium; a third laser light source which emits a third laser light having a wavelength longer than that of the second laser light for the third optical recording medium; and an objective lens whose numerical aperture (NA) is set to 0.75 or more for the first optical recording medium and in which at least one of first and second surfaces backing on to each other is formed as an aspheric surface and which converges the first to third laser lights onto signal surfaces of the first to third optical recording mediums, the objective lens satisfying the following expression:

$$t < a \cdot f + b$$

wherein t: an axial thickness of the objective lens,
f: a focal distance of the objective lens,
a: a coefficient, and
b: a constant,
and the coefficient a and the constant b satisfies that
  a=2.02, b=−1.94; a=2.08, b=−1.84; or a=2.11, b=−1.77.

According to the present invention, when a=2.02, b=−1.94, a working distance set between the objective lens and the third optical recording medium can be secured at 0.4 mm or more. When a=2.08, b=−1.84, the working distance set between the objective lens and the third optical recording medium can be secured at 0.3 mm or more. When a=2.11, b=−1.77, the working distance set between the objective lens and the third optical recording medium can be secured at 0.25 mm or more. Therefore, the objective lens does not collide with the first to third optical recording mediums, and this can contribute to enhancement of quality or reliability of the optical pickup device without damaging the objective lens and the first to third optical recording mediums.

Moreover, to achieve the object, there is provided an optical pickup device which selectively records or reproduces a first optical recording medium, and a second optical recording medium having a recording density lower than that of the first optical recording medium, the device comprising: a first laser light source which emits a first laser light for the first optical recording medium; a second laser light source which emits a second laser light having a wavelength longer than that of the first laser light for the second optical recording medium; and an objective lens whose numerical aperture (NA) is set to 0.75 or more for the first optical recording medium and in which at least one of first and second surfaces backing on to each other is formed as an aspheric surface and which converges the first and second laser lights onto signal surfaces of the first and second optical recording mediums, the objective lens satisfying the following expression:

$$t < a \cdot f + b$$

wherein t: an axial thickness of the objective lens, f: a focal distance of the objective lens, a: a coefficient, and b: a constant, and the coefficient a and the constant b satisfies that a=2.15, b=−1.62; a=2.23, b=−1.5; or a=2.28, b=−1.45.

According to the present invention, when a=2.15, b=−1.62, a working distance set between the objective lens and the second optical recording medium can be secured at 0.4 mm or more. When a=2.23, b=−1.5, the working distance set between the objective lens and the second optical recording medium can be secured at 0.3 mm or more. When a=2.28, b=−1.45, the working distance set between the objective lens and the second optical recording medium can be secured at 0.25 mm or more. Therefore, the objective lens does not collide with the first and second optical recording mediums, and this can contribute to the enhancement of the quality or reliability of the optical pickup device without damaging the objective lens and the first and second optical recording mediums.

The nature, principle and utility of the invention will become more apparent from the following detailed description when read in conjunction with the accompanying drawings.

DESCRIPTION OF THE PREFERRED EMBODIMENTS

An embodiment of an optical pickup device according to the present invention will be described hereinafter in detail with reference to FIGS. 1 to 12.

According to the present invention, an optical pickup device is characterized in that a working distance is set corresponding to an optical recording medium having a larger substrate thickness in order to prevent an objective lens from colliding with each optical recording medium while correcting sphere aberration generated by a difference of substrate thickness in selectively recording or reproducing at least two or more types of optical recording mediums having different substrate thicknesses using an objective lens having a numerical aperture (NA) of 0.75 or more.

Figure 1:
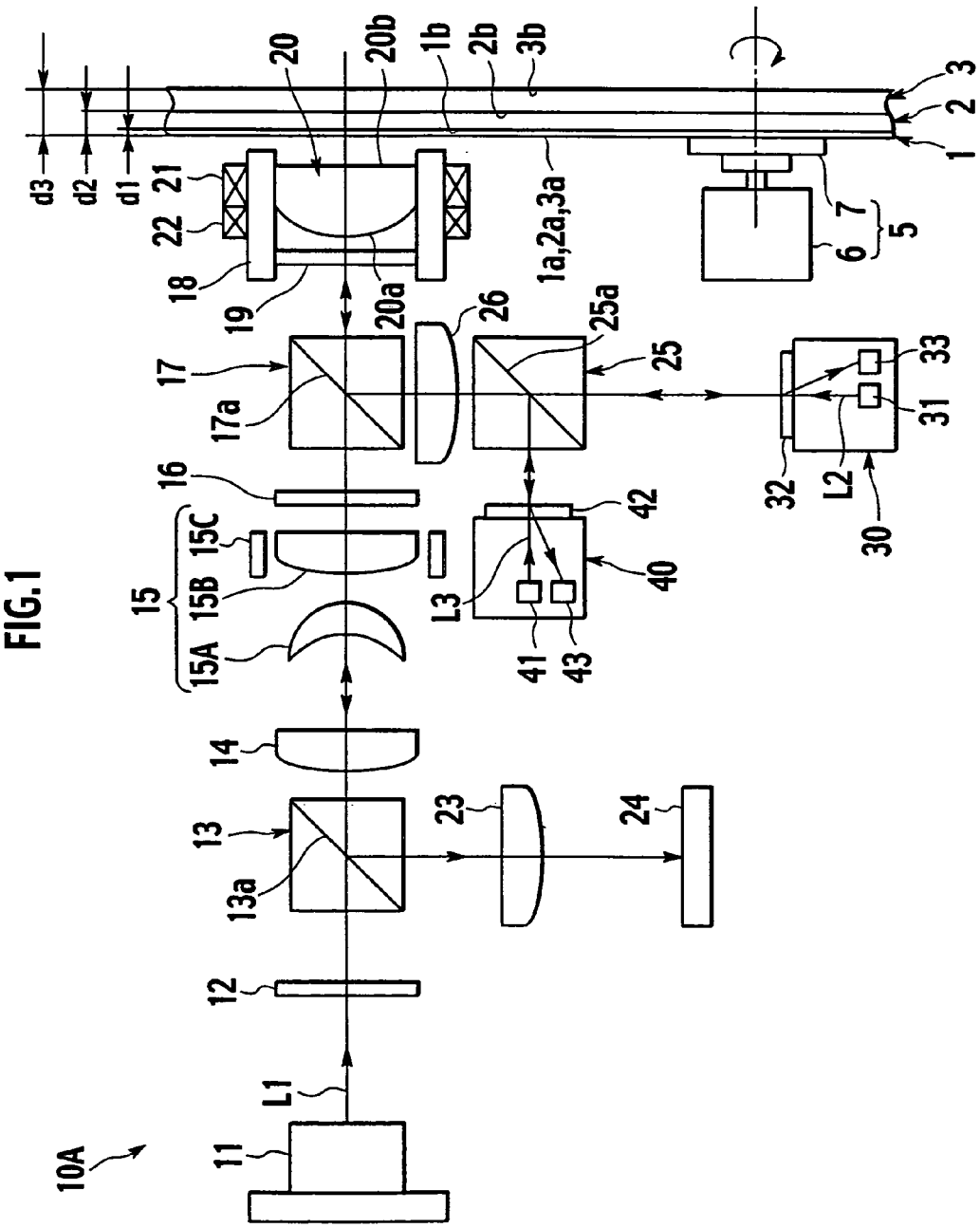
FIG. 1 is a diagram showing a whole constitution of one embodiment of an optical pickup device according to the present invention.

FIG. 1 is a diagram showing a whole constitution of one embodiment of the optical pickup device according to the present invention.

As shown in FIG. 1, an optical pickup device 10A according to the embodiment of the present invention has been developed in such a manner that: a first optical recording medium (hereinafter referred to as the extra-high density optical disc) 1 to record or reproduce an information signal by a first laser light L1 having a wavelength λ1 of 450 nm or less at an extra-high density; a second optical recording medium (hereinafter referred to as a DVD) 2 to record or reproduce the information signal by a second laser light L2 having a wavelength λ2 of around 650 nm, which is longer than the wavelength λ1 of the first laser light L1, at a high density; a third optical recording medium (hereinafter referred to as the CD) 3 to record or reproduce an information signal by a third laser light L3 having a wavelength λ3 of around 780 nm, which is longer than the wavelength λ2 of the second laser light L2; and a combined optical recording medium in which the first to third optical recording mediums 1 to 3 are appropriately combined and integrally stacked are selectively applicable.

It is to be noted that as a combined optical recording medium in which the first to third optical recording mediums 1 to 3 are appropriately combined and integrally stacked, there are a combination of the first and second optical recording mediums, that of the first and third optical recording mediums, and that of the second and third optical recording mediums. In these combined optical recording mediums, a total disc substrate thickness is formed in approximately 1.2 mm. In the following description, the individual optical recording mediums are described. Since the combined optical recording medium is the application, the description is omitted.

Moreover, in the following description, the application to the optical discs as the first to third optical recording mediums 1 to 3 will be described, but the present invention is not limited to this, and the card optical recording medium may also be used.

Furthermore, the first to third optical recording mediums 1 to 3 are selectively attached to a turntable 7 fixed to a shaft of a spindle motor 6 rotatably disposed in an optical disc driving device 5.

Here, in the extra-high density optical disc (Blue-ray disc) 1, a disc substrate thickness d1 between a laser beam incidence surface 1a and a signal surface 1b is set to be small approximately in a range of 0.05 mm to 0.15 mm, and a reinforcing plate is bonded to the disc so that a total thickness is formed to be large. The total thickness is, for example, about 1.2 mm.

Moreover, in the digital versatile disc (DVD) 2, a disc substrate thickness d2 between a laser beam incidence surface 2a and a signal surface 2b is set to about 0.6 mm, which is thicker than the extra-high density optical disc 1, and an approximately 0.6 mm thick reinforcing plate is bonded to the disc so that a total thickness is formed in about 1.2 mm.

Furthermore, in the compact disc (CD) 3, a disc substrate thickness d3 between a laser beam incidence surface 3a and a signal surface 3b is set to about 1.2 mm, and the disc is thicker than the DVD 2.

It is to be noted that in the embodiment, the disc substrate thicknesses d1, d2, d3 of the extra-high density optical disc 1, DVD 2, and CD 3 are set to, for example, 0.1 mm, 0.6 mm, 1.2 mm.

Moreover, under the laser beam incidence surface 1a of the extra-high density optical disc 1, the laser beam incidence surface 2a of the DVD 2, or the laser beam incidence surface 3a of the CD 3, the optical pickup device 10A according to the embodiment of the present invention is disposed movably in a diametric direction of each of the optical discs 1, 2, 3.

In the optical pickup device 10A according to the embodiment of the present invention, a first laser light source (hereinafter referred to as the blue semiconductor laser) 11 for emitting the first laser light L1 having a wavelength λ1 of 450 nm or less for the extra-high density optical disc 1 is disposed. A second laser light source (hereinafter referred to as the red semiconductor laser) 31 for emitting the first laser light L2 having a wavelength λ2 of around 650 nm for the DVD 2 is disposed. A third laser light source (hereinafter referred to as the infrared semiconductor laser) 41 for emitting the third laser light L3 having a wavelength λ3 of around 780 nm for the CD 3 is disposed.

It is to be noted that the wavelength λ1 of the first laser light L1 emitted from the blue semiconductor laser 11 is set, for example, to 405 nm, the wavelength λ2 of the second laser light L2 emitted from the red semiconductor laser 31 is set, for example, to 660 nm, and the wavelength λ3 of the third laser light L3 emitted from the infrared semiconductor laser 41 is set, for example, to 780 nm.

First, the blue semiconductor laser 11 side corresponding to the extra-high density optical disc 1 will be described. The first laser light L1 having the wavelength λ1=405 nm emitted from the blue semiconductor laser 11 is a divergent light of a linearly polarized light, this divergent light is incident upon a diffraction grating 12, and split into three beams comprising a 0-order diffracted light and ±1st order diffracted lights (hereinafter referred to as three beams) in accordance with pitch and angle of inclination of a concave/convex grating (not shown) formed in the diffraction grating 12. Thereafter, three beams are incident upon a polarizing beam splitter 13.

It is to be noted that in this embodiment, the diffraction grating 12 produces three beams, but there may be also a constitution in which the diffraction grating 12 is not disposed. In this case, the first laser light L1 emitted from the blue semiconductor laser 11 may be directly input as one beam into the polarizing beam splitter 13.

A semi-transparent reflective film 13a having a polarizing property is attached to the polarizing beam splitter 13 to pass three beams from the diffraction grating 12 and to reflect the reflected light from the extra-high density optical disc 1 described later so that the direction is turned approximately by 90°.

Thereafter, three beams by the first laser light L1 passed through the semi-transparent reflective film 13a in the polarizing beam splitter 13 are converted to a parallel light by a collimator lens 14 and incident upon a sphere aberration correction means 15.

The sphere aberration correction means 15 corrects sphere aberration generated by an optical system disposed between the blue semiconductor laser 11 and the signal surface 1b of the extra-high density optical disc 1 with a fluctuation of the disc substrate thickness d1 of the extra-high density optical disc 1. The means comprises a concave lens (negative lens) 15A disposed on a blue semiconductor laser 11 side, a convex lens (positive lens) 15B disposed on an objective lens 20 side described later, and an actuator 15C which displaces the convex lens 15B along an optical axis direction. Moreover, the convex lens 15B is displaced by the actuator 15C along the optical axis direction with respect to the concave lens 15A, an interval between the concave lens 15A and the convex lens 15B is controlled, a parallel degree of three beams incident upon the objective lens 20 is adjusted, the sphere aberration by a magnification error of the objective lens 20 is generated to offset another sphere aberration, and accordingly the sphere aberration is corrected to be zero. It is to be noted that a method of displacing the concave lens (negative lens) 15A along the optical axis direction with respect to the convex lens 15B may be employed.

Also, it is to be noted that in the embodiment, a combination of the concave lens 15A, convex lens 15B, and actuator 15C is used as the sphere aberration correction means, but a wavefront modulation element using a liquid crystal element or the like may also be applied instead.

Thereafter, three beams by the first laser light L1 passed through the sphere aberration correction means 15 pass through a wave plate 16 and a first dichroic prism 17 in that order. The wave plate 16 gives a phase difference of about ¼ wavelength (90°) with respect to three beams by the first laser light L1. Moreover, a semi-transparent reflective film 17a having a wavelength-selecting property is attached to the first dichroic prism 17 to pass the first laser light L1 having a wavelength $\lambda 1=405$ nm emitted from the blue semiconductor laser 11 and to reflect the light with respect to the second laser light L2 with a wavelength $\lambda 2=660$ nm emitted from the red semiconductor laser 31 and the third laser light L3 with a wavelength $\lambda 3=780$ nm emitted from the infrared semiconductor laser 41 so that the direction is turned approximately by 90°.

Thereafter, three beams by the first laser light L1 passed through the semi-transparent reflective film 17a in the first dichroic prism 17 pass straight as the parallel light without being diffracted by a wavefront conversion element 19 attached to a lower portion in a lens holder 18, and are incident upon the objective lens 20 attached to an upper portion in the lens holder 18. The first laser beams (three beams) focused by the objective lens 20 are incident upon the laser beam incidence surface 1a of the extra-high density optical disc 1 and converged onto the signal surface 1b.

In the wavefront conversion element 19, a diffraction structure (not shown) is formed, and the element is attached in the lens holder 18 in such a manner that the optical axis thereof matches that of the objective lens 20. The wavefront conversion element 19 allows the first laser light L1 having a wavelength $\lambda 1=405$ nm emitted from the blue semiconductor laser 11 to pass straight as the parallel light without being diffracted and to be incident upon the objective lens 20. Further, the wavefront conversion element 19 diffracts the second laser light L2 having a wavelength $\lambda 2=660$ nm emitted from the red semiconductor laser 31 while limiting the numerical aperture (NA) thereof into the objective lens 20 to about 0.6 and allows the light diverged by the diffraction to be incident upon the objective lens 20. Furthermore, the wavefront conversion element 19 diffracts the third laser light L3 having a wavelength $\lambda 3=780$ nm emitted from the infrared semiconductor laser 41 while restricting the numerical aperture (NA) thereof into the objective lens 20 to about 0.45 and allows the light diverged to a greater extent than that of the second laser light L2 to be incident upon the objective lens 20.

Here, the wavefront conversion element 19 is an element having an effect close to that of Fresnel lens, but may also be designed to incidentally have a function of correcting the sphere aberration in addition to a usual lens function. The wavefront conversion element 19 may have a binary structure or a stair-like diffraction structure so that a step of a staircase thereof has a depth close to a light path difference corresponding to an integer times the wavelength of 405 nm of the first laser light L1 and the element has a lens function for the second laser light L2 having a wavelength of 660 nm.

In this case, a setting is also possible such that the second laser light L2 having a wavelength of 660 nm and the third laser light L3 having a wavelength of 780 nm are allowed to be incident upon the wavefront conversion element 19 not only as the parallel lights but also the divergent lights. With the incidence as the divergent light, the pitch of the diffraction structure of the element is effectively broadened. In order to set appropriate divergence degrees of light flux for both the lights of 650 nm and 780 nm, it is effective to make both the incident lights on the element different from each other.

Moreover, in addition to the wavefront conversion element using a difference of function of the diffraction structure using a wavelength difference, it is also possible to apply an element (e.g., liquid crystal) having dependence on polarization, in which a difference of a polarizing direction in each wavelength is considered.

Furthermore, the numerical aperture of the objective lens 20 is set to 0.75 or more for the extra-high density optical disc 1, and at least one of first and second surfaces 20a, 20b backing on to each other is formed in an aspheric surface. In the embodiment, a single lens is used whose numerical aperture (NA) is 0.85 and which has an aplanatic characteristic or a nearly aplanatic characteristic. It is to be noted that the aplanat mentioned herein completely corrects an axial sphere aberration and satisfies a sine condition (condition on which any comatic aberration is not generated outside an axis).

Moreover, a focusing coil 21 and a tracking coil 22 are attached integrally to an outer surface of the lens holder 18, and the objective lens 20 integral with the lens holder 18 via a plurality of suspension wires (not shown) fixed to the outer surface of the lens holder 18 is controllable in a focusing direction and a tracking direction with respect to the extra-high density optical disc 1, DVD 2, or CD 3.

Thereafter, the first laser beams (three beams) focused by the objective lens 20 are incident upon the laser beam incidence surface 1a of the extra-high density optical disc 1, and converged onto the signal surface 1b to reproduce, record, or delete the data with respect to the signal surface 1b.

Furthermore, a first reflected light returned by the first laser beams reflected on the signal surface 1b of the extra-high density optical disc 1 is incident upon the objective lens 20 again in reverse to the above-described order, and passes through the wavefront conversion element 19, first dichroic prism 17, wave plate 16, sphere aberration correction means 15, and collimator lens 14 in that order. After the light is reflected on the semi-transparent reflective film 13a having a polarizing property in the polarizing beam splitter 13 to turn its direction approximately by 90°, the light is converged into a first photodetector 24 via a cylindrical lens 23. Moreover, the first photodetector 24 detects a tracking error signal, a focus error signal, and a main data signal at the time of reproduction of the signal surface 1b of the extra-high density optical disc 1.

Next, a red semiconductor laser 31 side for the DVD 2 will be described. The second laser light L2 having a wavelength $\lambda 2=660$ nm emitted from the red semiconductor laser 31 in an integrated device 30 for DVD is a divergent light of a linearly polarized light, and this divergent light passes through a hologram element 32. In this case, in the integrated device 30 for DVD, the red semiconductor laser 31, the hologram element 32 disposed above the red semiconductor laser 31, and a second photodetector 33 disposed on the right side of the red semiconductor laser 31 are integrated on a semiconductor substrate (not shown).

Thereafter, the second laser light L2 passed through the hologram element 32 forms the parallel light by a collimator lens 26 through a second dichroic prism 25. In this case, a semi-transparent reflective film 25a having a wavelength selecting property is attached to the second dichroic prism 25 to pass the second laser light L2 having a wavelength $\lambda 2=660$ nm emitted from the red semiconductor laser 31. On the other hand, the third laser light L3 having a wavelength $\lambda 3=780$ nm emitted from the infrared semiconductor laser 41 is reflected to turn the direction approximately by 90°.

Furthermore, the second laser light L2 which has passed through the collimator lens 26 is reflected by the semi-transparent reflective film 17a having the wavelength selecting property in the first dichroic prism 17 to turn a ray direction approximately by 90°. An aperture is restricted by the wavefront conversion element 19 such that the numerical aperture (NA) into the objective lens 20 with respect to the second laser light L2 corresponds to 0.6. Moreover, the second laser light L2 is diffracted by the wavefront conversion element 19, a 1st order diffracted light by the diffraction forms a divergent light and is incident upon the objective lens 20. Second laser beams obtained by focusing the second laser light L2 by the objective lens 20 are incident upon the laser beam incidence surface 2a of the DVD 2 and converged onto the signal surface 2b, and the reproducing, recording, or deleting is performed with respect to the signal surface 2b of the DVD 2 by the second laser beams.

Furthermore, a second reflected light returned by the second laser beams reflected on the signal surface 2b of the DVD 2 is incident upon the objective lens 20 again in reverse to the above-described order, and is reflected on the semi-transparent reflective film 17a in the first dichroic prism 17 through the wavefront conversion element 19 to turn the ray direction approximately by 90°. Thereafter, the light passes through the collimator lens 26 and the semi-transparent reflective film 25a in the second dichroic prism 25 in that order, and is diffracted by the hologram element 32 and is converged onto the second photodetector 33. Moreover, the second photodetector 33 detects the tracking error signal, focus error signal, and main data signal at the time of the reproduction on the signal surface 2b of the DVD 2.

Next, an infrared semiconductor laser 41 side for the CD 3 will be described. The third laser light L3 having a wavelength λ3=780 nm emitted from the infrared semiconductor laser 41 in an integrated device 40 for CD is the divergent light of the linearly polarized light, and this divergent light passes through a hologram element 42. In this case, the integrated device 40 for CD has a constitution similar to that of the integrated device 30 for DVD. The infrared semiconductor laser 41, the hologram element 42 disposed above the infrared semiconductor laser 41, and a third photodetector 43 disposed on the right side of the infrared semiconductor laser 41 are integrated on the semiconductor substrate (not shown).

Thereafter, the third laser light L3 which has passed through the hologram element 42 is reflected on the semi-transparent reflective film 25a having the wavelength selecting property in the second dichroic prism 25 to turn the ray direction approximately by 90°. Thereafter, the light is formed into the parallel light by the collimator lens 26, and is further reflected on the semi-transparent reflective film 17a in the first dichroic prism 17 to turn the ray direction approximately by 90°. The aperture is restricted by the wavefront conversion element 19 such that the numerical aperture (NA) into the objective lens 20 with respect to the third laser light L3 corresponds to 0.45. Moreover, the third laser light L3 is diffracted by the wavefront conversion element 19, and the 1st order diffracted light by the diffraction forms a divergent light having a diffraction degree higher than that of the second laser light L2, and is incident upon the objective lens 20. Third laser beams obtained by focusing the third laser light L3 by the objective lens 20 are incident upon the laser beam incidence surface 3a of the CD 3 and converged onto the signal surface 3b, and the reproducing, recording, or deleting is performed with respect to the signal surface 3b of the DVD 3 by the third laser beams.

Furthermore, a third reflected light returned by the third laser beams reflected on the signal surface 3b of the CD 3 is incident upon the objective lens 20 again in reverse to the above-described order, and is reflected on the semi-transparent reflective film 17a in the second dichroic prism 17 through the wavefront conversion element 19 to turn the ray direction approximately by 90°. Thereafter, the light passes through the collimator lens 26, and is reflected on the semi-transparent reflective film 25a having the wavelength selecting property in the second dichroic prism 25 to turn the ray direction by 90°. The light is diffracted by the hologram element 42 and is converged onto the third photodetector 43. Moreover, the third photodetector 43 detects the tracking error signal, focus error signal, and main data signal at the time of the reproduction on the signal surface 3b of the CD 3.

Next, a modification in which the optical pickup device 10A according to the embodiment of the present invention is partly modified will be briefly described with reference to FIG. 2.

Figure 2:
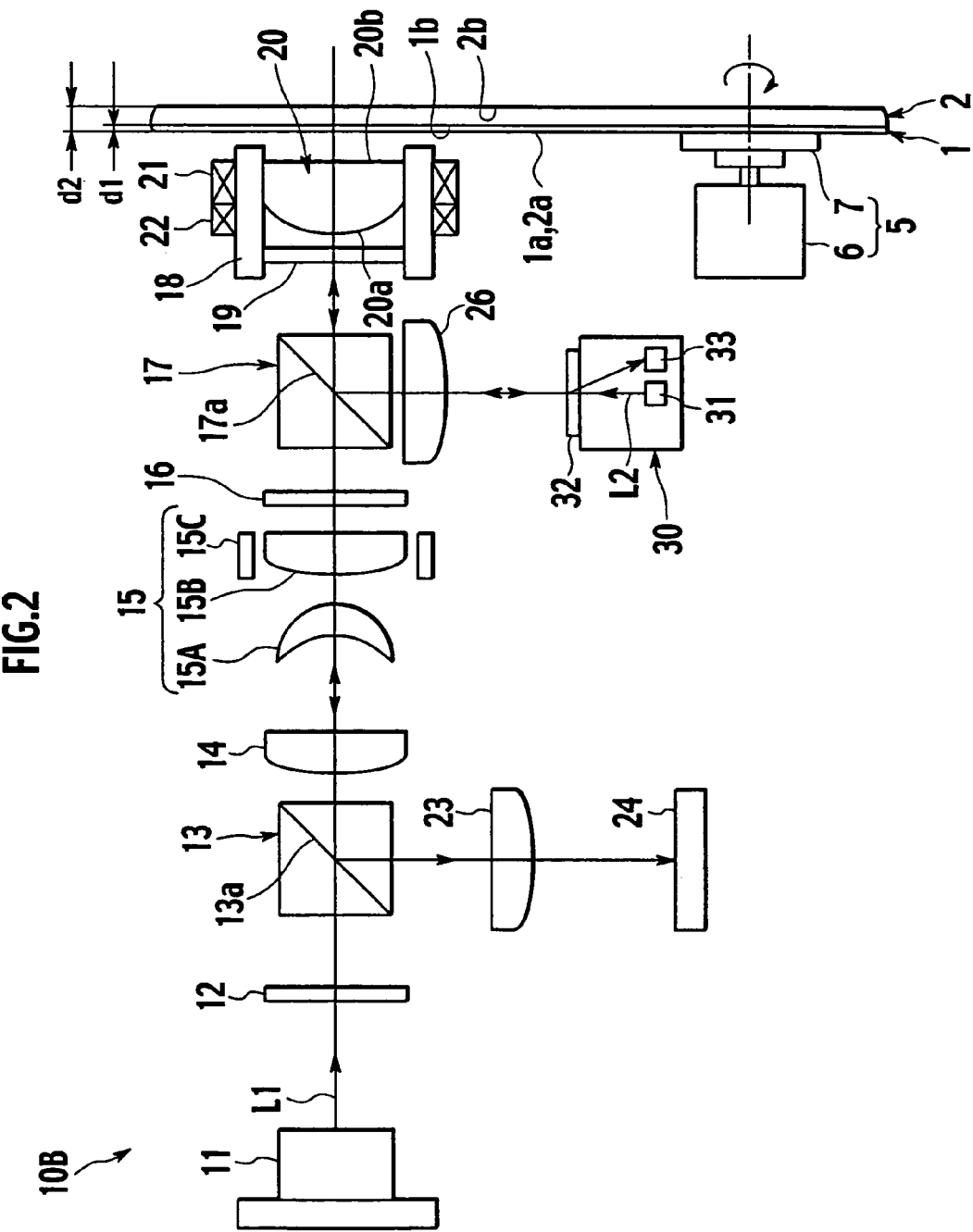
FIG. 2 is a diagram showing a whole constitution of the optical pickup device of a modification in which a part of the embodiment of the optical pickup device according to the present invention is modified.

FIG. 2 is a diagram showing the whole constitution of the optical pickup device of the modification in which a part of the embodiment of the optical pickup device according to the present invention is modified.

An optical pickup device 10B of the modification shown in FIG. 2 has a constitution similar to that of the optical pickup device 10A described above with reference to FIG. 1 except a part. Here, for the convenience of description, the above-described constituting members are denoted with the same reference numerals, and only the respects different from the optical pickup device 10A will be described.

As shown in FIG. 2, the optical pickup device 10B according to the modification has been developed in such a manner that: a first optical recording medium (hereinafter referred to as the extra-high density optical disc) 1 to record or reproduce an information signal by a first laser light L1 having a wavelength λ1 of 450 nm or less at an extra-high density; a second optical recording medium (hereinafter referred to as a DVD) 2 to record or reproduce the information signal by a second laser light L2 having a wavelength λ2 of around 650 nm, which is longer than the wavelength λ1 of the first laser light L1, at a high density; and a combined optical recording medium in which the first and second optical recording mediums 1 and 2 are combined and integrally stacked are selectively applicable. It is to be noted that as a combined optical recording medium in which the first and second optical recording mediums are combined is formed in a total disc substrate thickness of about 1.2 mm.

In the optical pickup device 10B of the modification, the blue semiconductor laser 11 and red semiconductor laser 31 are disposed to selectively record or reproduce the extra-high density optical disc 1 and DVD 2, but the device does not cope with the CD 3, and accordingly the integrated device 40 for CD, and second dichroic prism 25 shown in FIG. 1 are omitted. The semi-transparent reflective film 17a attached in the first dichroic prism 17 and having the wavelength selecting property passes the first laser light L1 having a wavelength λ1=405 nm emitted from the blue semiconductor laser 11, and reflects the second laser light L2 having a wavelength λ2=660 nm emitted from the red semiconductor laser 31 to turn the direction approximately by 90°.

Therefore, the device is different from the optical pickup device 10A in that the second laser light L2 from the red semiconductor laser 31 disposed in the integrated device 30 for DVD is directly incident upon the collimator lens 26.

Since the modification copes with only two types of optical discs 1, 2, the modification can be inexpensively constituted as compared with a case where three types of optical discs 1, 2, 3 are handled.

Here, there are two problems to be studied, in keeping downward compatibility of three types (or two types) of optical discs 1 to 3 (or 1 and 2) having different disc substrate thicknesses to selectively record or reproduce the discs using the optical pickup device 10A (or 10B) constituted as described above. A first problem is to handle the sphere aberration generated by the difference of the disc substrate thickness. A second problem is that a working distance set between the objective lens and the optical disc is shortened, when recording or reproducing the optical disc having a larger disc substrate thickness.

First, the sphere aberration which is the first problem will be described. Methods of correcting the sphere aberration while keeping the downward compatibility with respect to three types (or two types) of optical discs 1 to 3 (or 1 and 2) includes a finite correction method, a wavefront correction method, and a combined method of the finite correction method with the wavefront correction method.

In the finite correction method, an image forming magnification of the objective lens 20 is changed by the sphere aberration correction means 15 described above with reference to FIG. 1 to generate a sphere aberration by the magnification error to cancel other sphere aberrations.

Moreover, in the wavefront correction method, a wavefront capable of offsetting or reducing the sphere aberration due to the optical disc is generated by a liquid crystal or the like to perform the correction.

Furthermore, in the combined method, the remaining sphere aberration in the finite correction method is further corrected by the wavefront correction method.

In this case, in the downward compatibility, the wavelengths of the laser lights also usually differ from each other. Therefore, in consideration of the sphere aberration due to the difference in wavelength of the laser lights, an actual optical system is designed. Furthermore, in the downward compatibility, the numerical aperture (NA) into the objective lens 20 differs in accordance with the type of the optical disc. Therefore, the numerical aperture is set to be small by an aperture restriction means having a wavelength selecting property in a case where the DVD 2 or the CD 3 having a recording density lower than that of the extra-high density optical disc 1 is recorded or reproduced. Moreover, a degree of correction of sphere aberration varies from complete correction to a case where an aberration corresponding to Marechal reference value (0.07$\lambda$·rms) or more remains, assuming that the wavelength of the laser light is $\lambda$.

The above-described optical pickup device 10A (or 10B) is an example, an optical pickup device may be constituted by application of a similar function even with a concretely different constitution. Further in the separation into each wavelength, a difference of polarization may also be used instead of a difference of wavelength.

The restricting of the aperture into the objective lens 20 can be realized by having the diffraction structure only inside a necessary numerical aperture (NA), but may also be realized by a coat or diffraction structure which substantially changes the transmittance dependent on wavelength in the unnecessary outside.

Next, the working distance which is the second problem will be described with reference to FIGS. 3 to 12.

Figure 3:
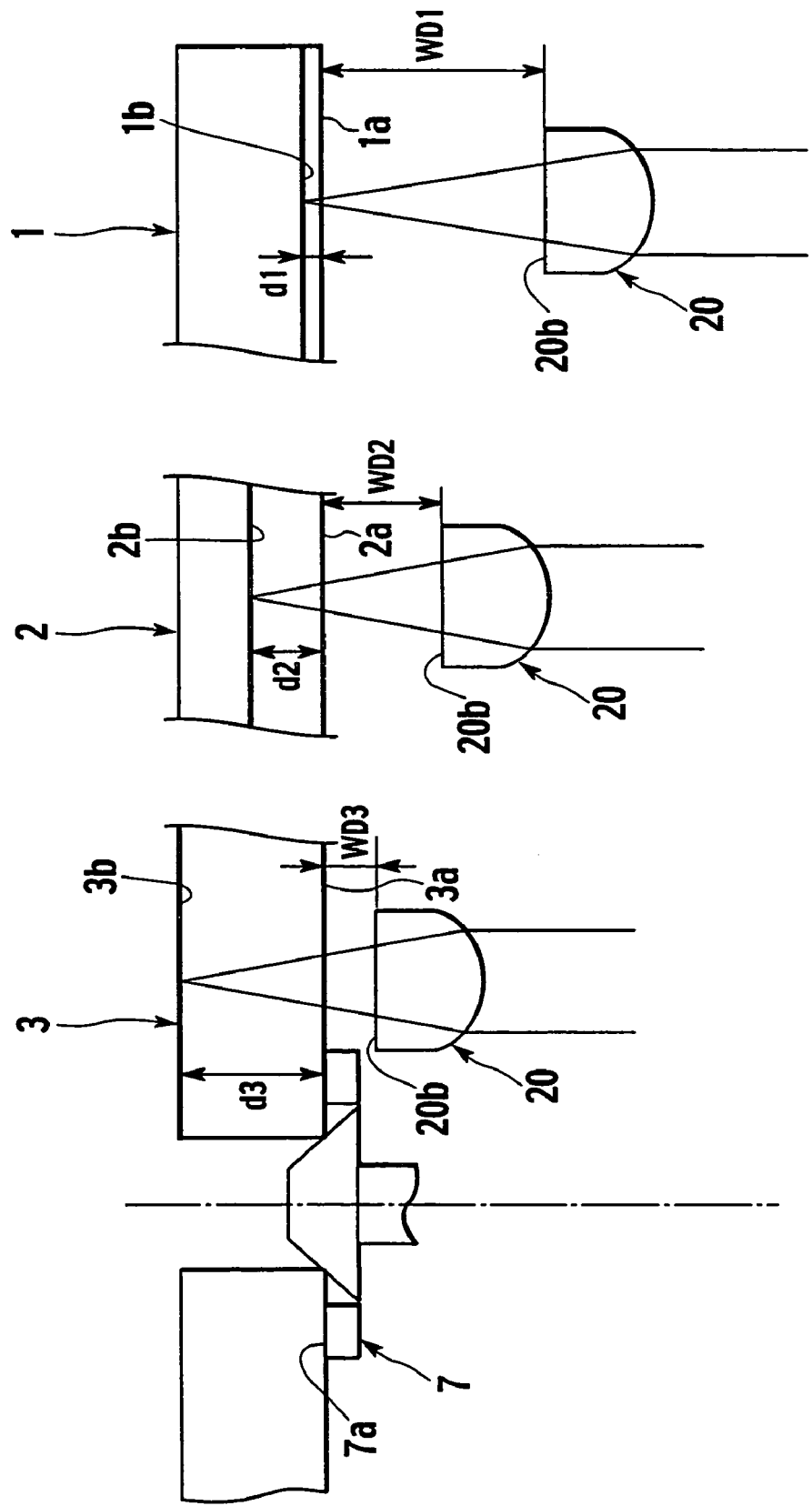
FIG. 3 is a diagram schematically showing a working distance WD1 of an extra-high density optical disc 1, a working distance WD2 of a DVD 2, and a working distance WD3 of a CD 3.
Figure 4:
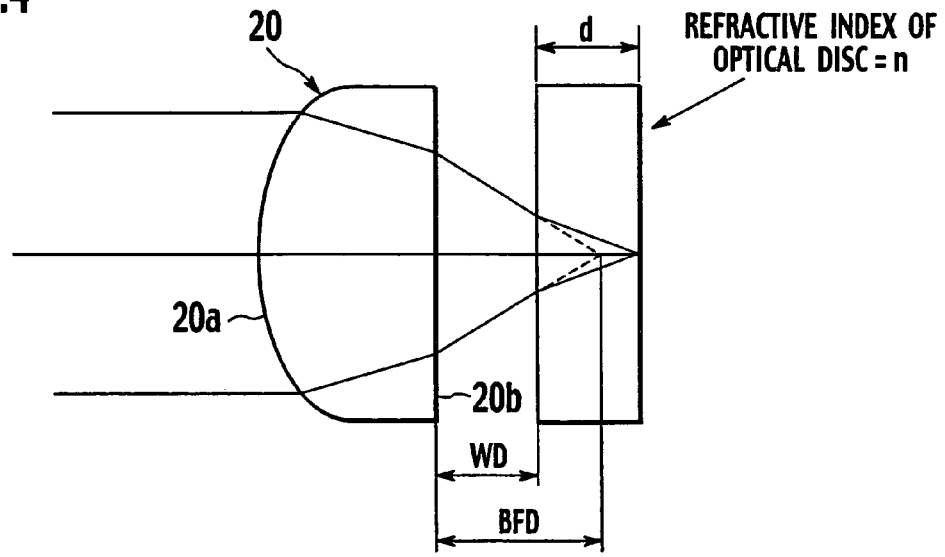
FIG. 4 is a diagram schematically showing a method of applying a wavefront correction method to a sphere aberration to calculate a working distance.
Figure 5:
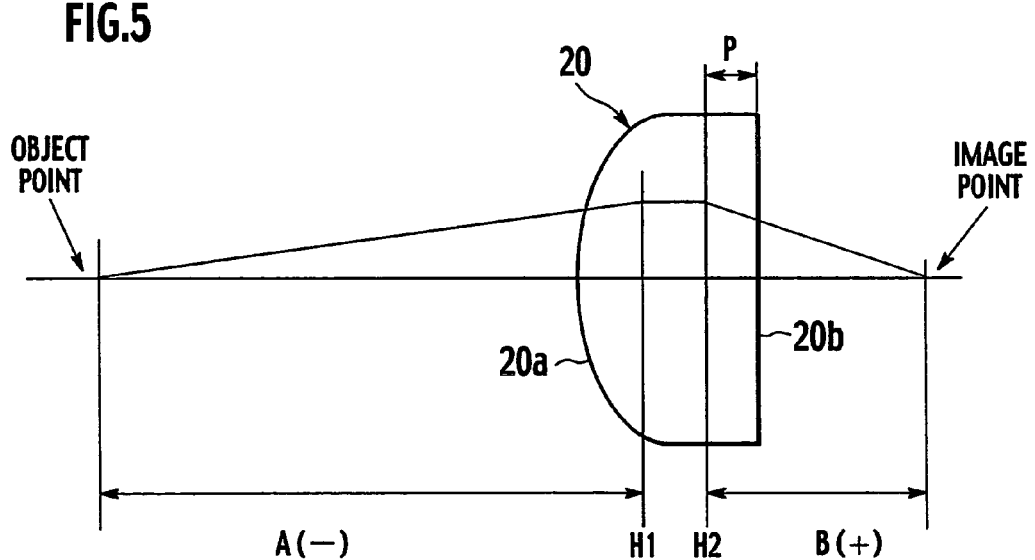
FIG. 5 is a diagram schematically showing an image forming relation of a single objective lens body at a time when an object point constituting a finite distance is formed into an image with a finite magnification as in a finite correction method.
Figure 6:
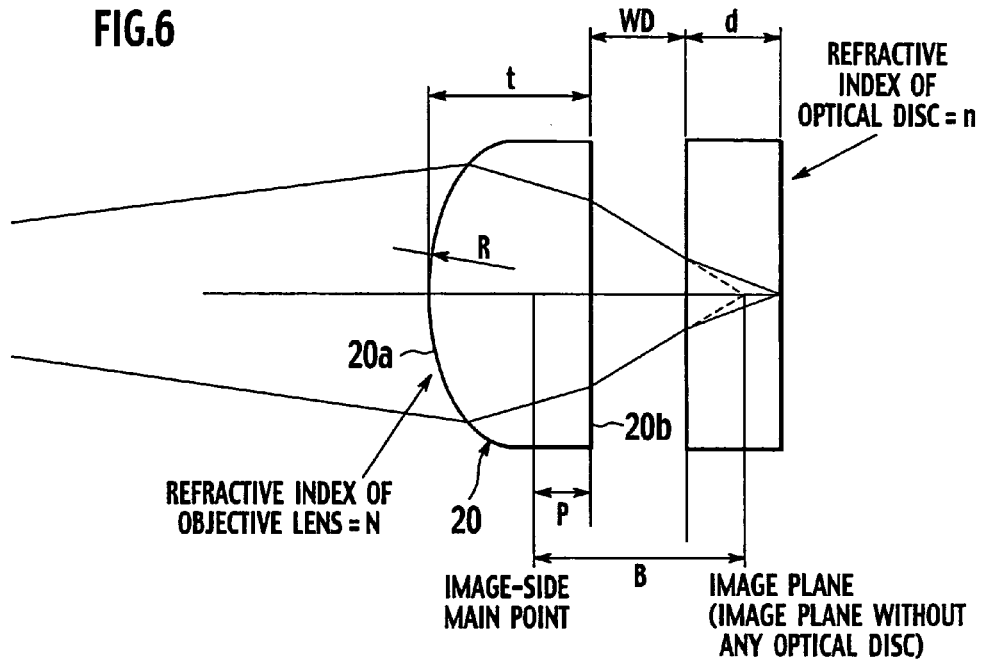
FIG. 6 is a diagram schematically showing a method of applying a finite correction method to the sphere aberration to calculate the working distance.
Figure 7:
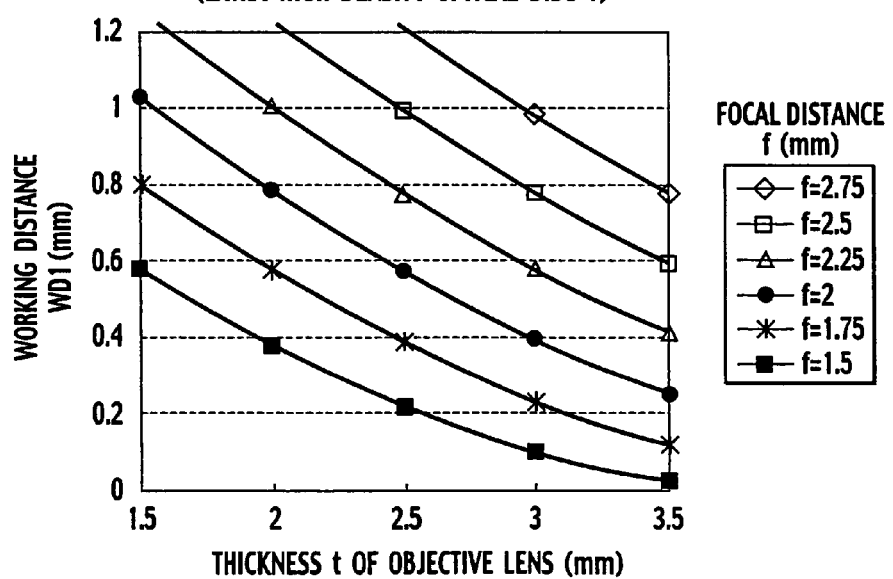
FIG. 7 is a diagram showing a result of calculation of the working distance to the extra-high density optical disc by application of the finite correction method at a time when thickness and focal distance of the objective lens are varied.
Figure 8:
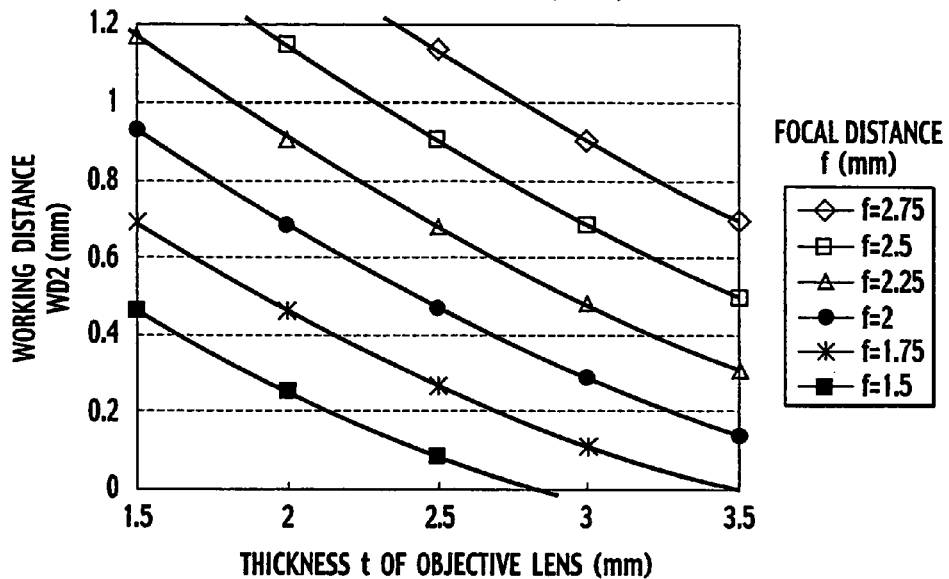
FIG. 8 is a diagram showing a result of calculation of the working distance to a DVD by the application of the finite correction method at a time when the thickness and focal distance of the objective lens are varied.
Figure 9:
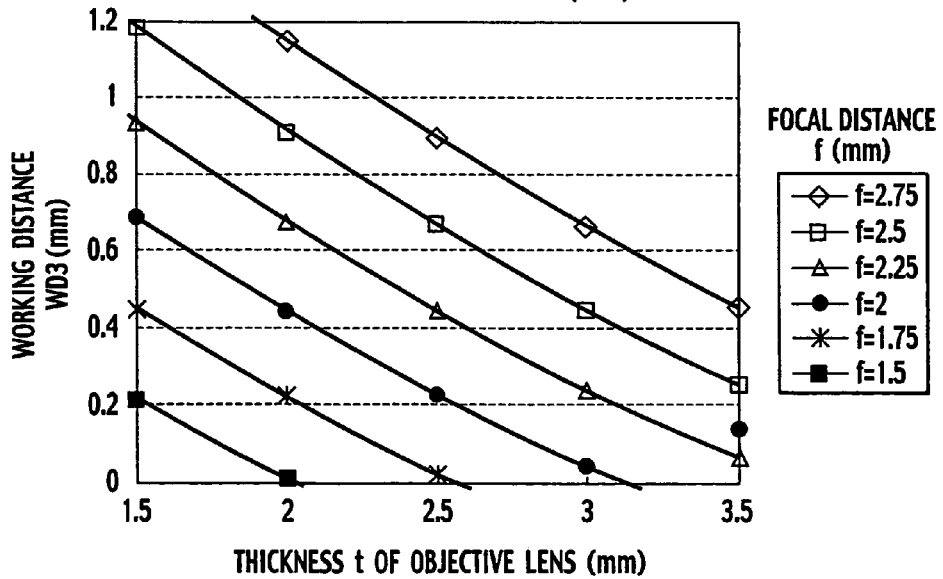
FIG. 9 is a diagram showing a result of calculation of the working distance to a CD by the application of the finite correction method at a time when the thickness and focal distance of the objective lens are varied.
Figure 10:
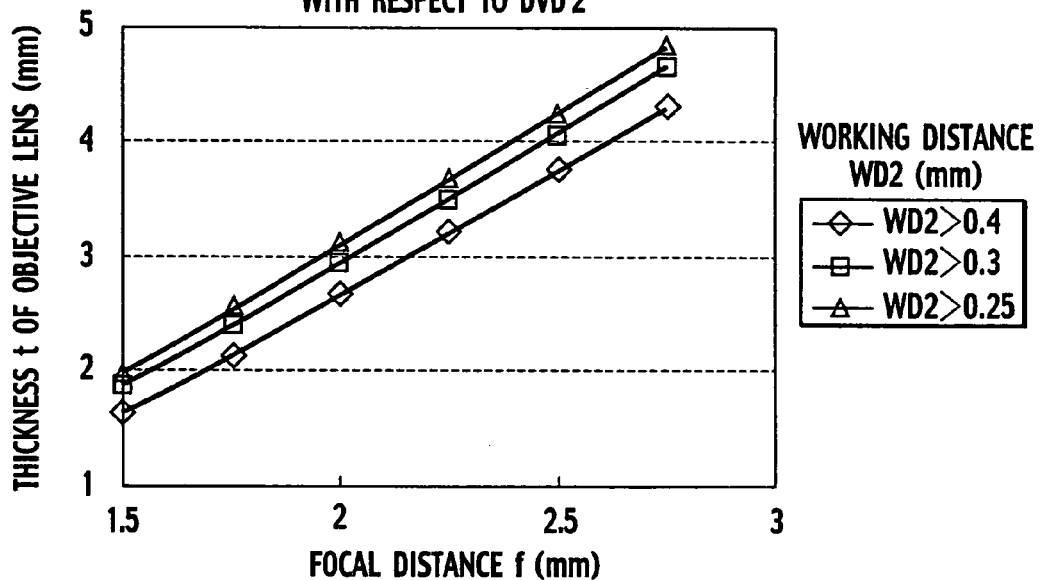
FIG. 10 is a diagram showing conditions for securing the working distance to the DVD.
Figure 11:
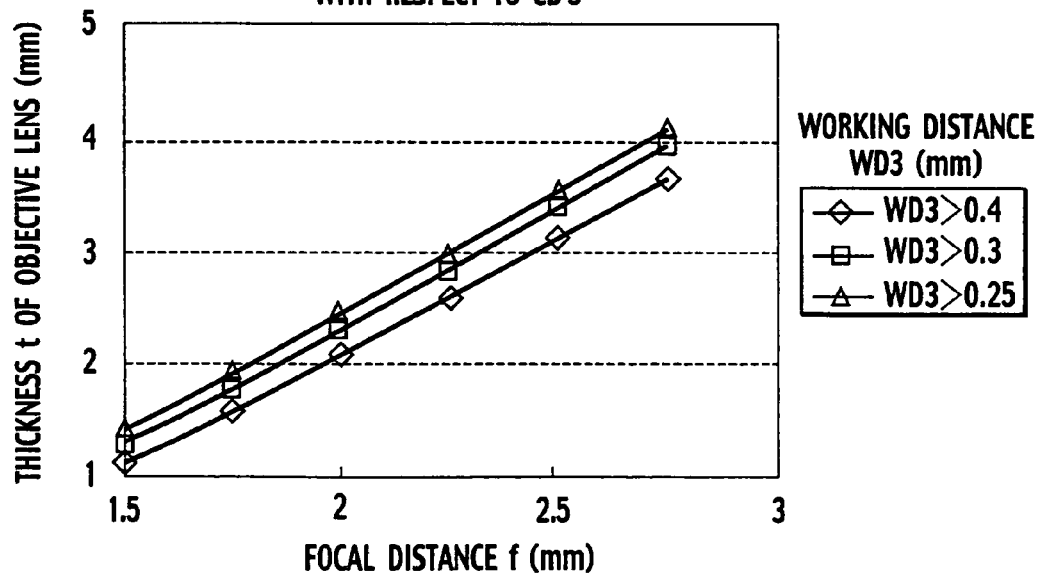
FIG. 11 is a diagram showing conditions for securing the working distance to the CD.
Figure 12:
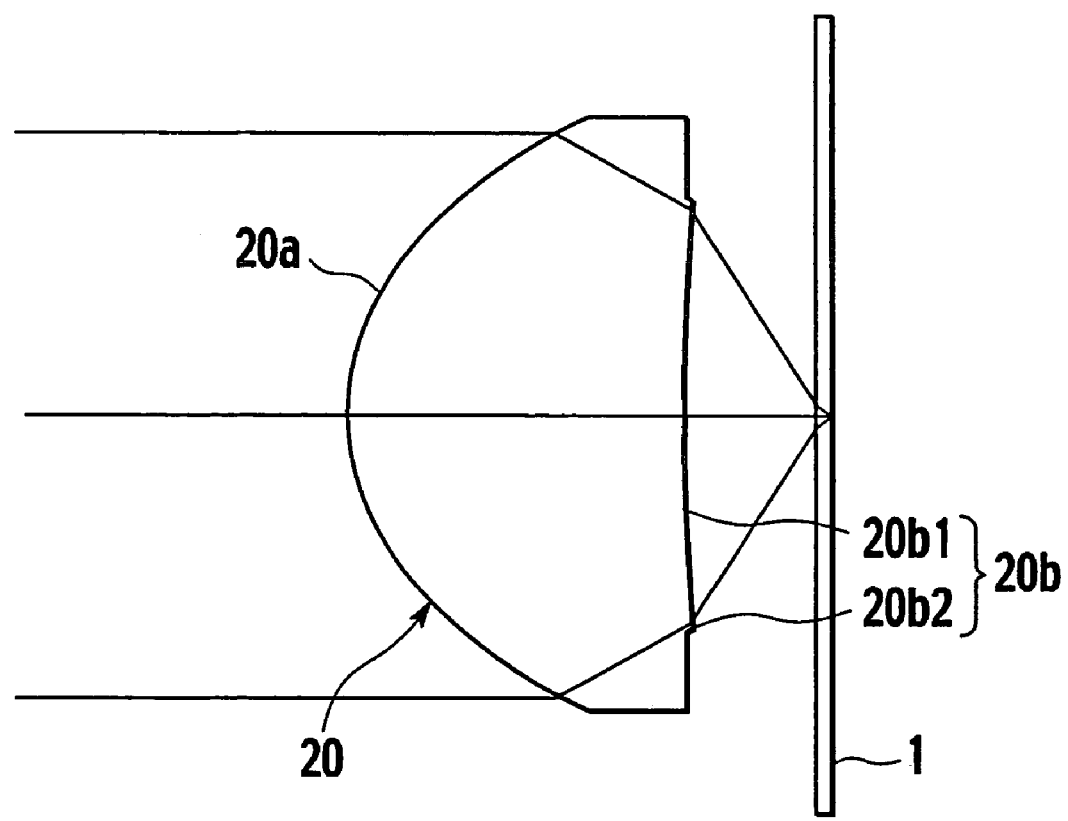
FIG. 12 is a diagram showing a case where the objective lens is formed in a meniscus shape.

FIG. 3 is a diagram schematically showing a working distance WD1 of the extra-high density optical disc 1, a working distance WD2 of a DVD 2, and a working distance WD3 of a CD3. FIG. 4 is a diagram schematically showing a method of applying the wavefront correction method to a sphere aberration to calculate a working distance. FIG. 5 is a diagram schematically showing an image forming relation of a single objective lens body at a time when an object point constituting a finite distance is formed into an image with a finite magnification as in the finite correction method. FIG. 6 is a diagram schematically showing a method of applying the finite correction method to a sphere aberration to calculate a working distance. FIG. 7 is a diagram showing a result of calculation of the working distance to the extra-high density optical disc by application of the finite correction method at a time when thickness and focal distance of the objective lens are varied. FIG. 8 is a diagram showing a result of calculation of the working distance to the DVD by the application of the finite correction method at a time when the thickness and focal distance of the objective lens are varied. FIG. 9 is a diagram showing a result of calculation of the working distance to the CD by the application of the finite correction method at a time when the thickness and focal distance of the objective lens are varied. FIG. 10 is a diagram showing conditions for securing the working distance to the DVD. FIG. 11 is a diagram showing the conditions for securing the working distance to the CD. FIG. 12 is a diagram showing a case where the objective lens is formed in a meniscus shape.

The working distance is an important factor in designing the objective lens 20 for the extra-high density optical disc. Especially in recording or reproducing a plurality of optical discs 1 to 3 using the objective lens 20 designed with aplanatic characteristics for the extra-high density optical disc, the working distance becomes short as the disc substrate thickness becomes long. Accordingly, a problem occurs that dangerousness of collision of the objective lens 20 with an optical disc having a larger disc substrate thickness increases.

That is, as shown in FIG. 3, the extra-high density optical disc 1 in which a disc substrate thickness d1 between the laser beam incidence surface 1a and the signal surface 1b is 0.1 mm, the DVD 2 in which a disc substrate thickness d2 between the laser beam incidence surface 2a and the signal surface 2b is 0.6 mm, and the CD 3 in which a disc substrate thickness d3 between the laser beam incidence surface 3a and the signal surface 3b is 1.2 mm are selectively attached onto the turntable 7. In this case, the working distance set between the second surface 20b of the objective lens 20 and the laser beam incidence surface 1a of the extra-high density optical disc 1 designed for the extra-high density optical disc is WD1. The working distance set between the second surface 20b of the objective lens 20 and the laser beam incidence surface 2a of the DVD 2 is WD2. Furthermore, the working distance between the second surface 20b of the objective lens 20 and the laser beam incidence surface 3a of the CD 3 is WD3. Additionally, a dimensional relation of the working distances is WD1>WD2>WD3.

Here, the working distance is ideally sufficiently longer than an amount obtained by adding an attaching error of a thickness direction at a time when the optical disc (1, 2, 3) is chucked onto the turntable 7 to a surface vibration of the optical disc. However, in actual, a restriction in optical design makes it difficult to set the working distance to be long. Furthermore, there is also a restriction by a demand for miniaturization (when a size increases, needless to say, the working distance lengthens). Therefore, it is practically important to clarify the working distance having a minimum length to such an extent that any problem does not occur with respect to the optical discs 1, 2, 3 having different disc substrate thicknesses in practical use.

First, in consideration of values in specification for the optical disc, a maximum surface vibration in the CD is about 0.6 mm, and a maximum surface vibration in the DVD is about 0.35 mm.

In this case, the dangerousness of the collision of the objective lens 20 with the optical disc (1, 2, 3) is highest at the time of lead-in of focus servo. Considering that the lead-in of the focus servo is performed in the vicinity of an innermost circular region of the optical disc where a lead-in signal exists, the surface vibration of the optical disc is small in the innermost circular region, and is 0.25 mm or less in most cases. Even when an increase of an attaching error by the chucking of the optical disc onto the turntable 7 is included, the vibration is 0.3 mm or less. Furthermore, even when an allowance of 0.1 mm is set to a mechanical dimensional tolerance with an optical disc attaching surface 7a of the turntable 7, the vibration is 0.4 mm or less.

Therefore, it is an object to secure a working distance of at least 0.25 mm or more, preferably 0.3 mm or more, more preferably 0.4 mm or more in an inner circular region of the optical disc having the largest disc substrate thickness among a plurality of optical discs (1 to 3).

On the other hand, the surface vibration in the outer circular region of the optical disc is larger than that in the inner circular region, but any problem does not occur because the objective lens 20 does not collide with the outer circular region of the optical disc as long as the focus servo operates.

Here, a decrease in working distance at the time of recording or reproducing an optical disc having a larger disc substrate thickness will be described.

In general, the decrease of the working distance is large in the wavefront correction method, and small in the finite correction method. The reason is that in the wavefront correction method, an incident light upon the objective lens 20 is substantially a parallel light as shown in FIG. 4. Therefore, the working distance WD by the application of the wavefront correction method to the sphere aberration shortens by an optical length d/n of the disc substrate thickness d of the optical disc to a refractive index n of the optical disc in accordance with the following expression (1). This state is shown in FIG. 4.

$$\text{Working distance WD} = (\text{back focus distance BFD}) - (\text{optical length } d/n) \quad (1)$$

A concrete example of the wavefront correction method will be described based on the above expression (1). When the objective lens 20 having the working distance WD1 of 0.8 mm shown in FIG. 3 with the extra-high density optical disc 1 having a disc substrate thickness d1=0.1 mm, refractive index n=1.6 is used, the working distance WD2 shown in FIG. 3 for the DVD 2 having a disc substrate thickness d2=0.6 mm, refractive index n=1.58 is 0.483 mm and the working distance WD3 shown in FIG. 3 for the CD 3 having a disc substrate thickness d3=1.2 mm, refractive index n=1.57 is 0.098 mm. As understood from this example, as the disc substrate thickness becomes long such as the DVD 2 and then the CD 3, the working distance becomes extremely short.

However, in the example of the wavefront correction method, the working distance WD3 of the CD 3 with respect to the working distance WD1 of the extra-high density optical disc 1 is approximately 0.7 mm which indicates a large difference. To realize this, a considerably large-sized actuator is required, and it is considerably difficult to secure properties (frequency characteristic, straight property of operation). Moreover, as apparent in the example, especially the working distance WD3 of the CD 3 considerably shortens, and there is a large practical problem.

It is to be noted that, strictly to say, the focal distance of the objective lens 20 also changes dependent upon the wavelength of a laser light, but this change amount is several tens of μm or less, and this can be said to be smaller than an expected working distance.

On the other hand, in the finite correction method, when the disc substrate thickness increases, a divergent light is incident upon the objective lens 20 as shown in FIGS. 5 and 6 to correct a sphere aberration. Since the divergent light is incident, a back focus distance is longer than that in a parallel light incidence. Therefore, the decrease of the working distance can be suppressed, and thus the distance can be made long.

Here, there is an optimum divergence degree for the correction of the sphere aberration. To further suppress the decrease of the working distance, a light having a higher divergence degree may be incident. In this case, the correction of the sphere aberration exceeds an appropriate amount. Therefore, the method is preferably combined with the wavefront correction method. Additionally, when such high-divergent light is incident, there is also a problem that an eccentricity tolerance between the optical axis of the divergence light and that of the objective lens is strict. On the other hand, in the incidence with an appropriate divergence degree, the eccentricity tolerance between the optical axes increases.

Here, it is necessary to appropriately correct the sphere aberration regardless of the correction method. In the aberration correction, correction of the sphere aberration is performed with respect to the light flux inside the necessary numerical aperture into the objective lens, and with respect to the light flux outside the numerical aperture, a restricting aperture having wavelength selecting property and so on makes it not contribute to an image formation.

Additionally, the following has been clarified with respect to the finite correction method by the present inventors' studies.

When the objective lens 20 designed with the aplanatic characteristic for the extra-high density optical disc is used, there are relations of the following expressions (2), (3) with respect to each magnification α capable of correcting each sphere aberration of the DVD 2 having a disc substrate thickness of 0.6 mm and the CD 3 having a disc substrate thickness of 1.2 mm to be optimum:

An optimum magnification with respect to the DVD 2:

$$-0.148/\text{fd(mm)} \quad (2), \text{ and}$$

An optimum magnification with respect to the CD 3:

$$-0.266/\text{fc(mm)} \quad (3)$$

wherein fd: focal distance at the time of incidence of the laser light having a wavelength of 650 nm upon the objective lens 20 whose numerical aperture is restricted to 0.6; and fc: focal distance at the time of incidence of the laser light having a wavelength of 780 nm upon the objective lens 20 whose numerical aperture is restricted to 0.45.

In this case, since the focal distance fd is substantially equal to the focal distance fc, an absolute value of the optimum magnification with respect to the CD 3 is larger than that of the optimum magnification with respect to the DVD 2 from the above-described expressions (2), (3) so that the light flux having a higher divergence degree is incident upon the objective lens 20. At this time, the single objective lens 20 has an image forming relation as shown in FIG. 5.

Moreover, when the laser beam focused by the objective lens 20 in the state shown in FIG. 5 is applied onto the optical disc (1 to 3), and the finite correction method is applied with respect to the sphere aberration, the working distance WD can be calculated in accordance with the following expression (4). This state is shown in FIG. 6.

Working distance WD $$= (B+P) - (\text{optical length } d/n) \quad (4)$$

wherein

α: an image forming magnification,

B: a distance between an image-side main point and an image plane:

$$B = f(1-\alpha)$$

P: an axial distance from an image-side main point H2 and the second surface 20b of the objective lens 20:

$$P = -f(N-1)t/N/R1$$

f: a focal distance of the objective lens 20,

N: a refractive index of the objective lens 20,

R1: a curvature radius of the first surface 20a of the objective lens 20, and t: a thickness of the objective lens 20.

Next, a change of the working distance WD at the time of the application of the finite correction method with respect to the sphere aberration was calculated with respect to the concrete objective lens 20.

In the following calculation, the objective lens 20 satisfying the following conditions was used to compare changes of the working distance WD with respect to the extra-high density optical disc 1, DVD 2, and CD 3.

[Design Conditions of Objective Lens]

The objective lens 20 is aplanatically designed in accordance with the extra-high density optical disc 1 having a disc substrate thickness d1 of 0.0875 mm. When the first laser light L1 having a wavelength of 405 nm is incident upon the objective lens 20, and the first laser beam focused by the objective lens 20 is applied onto the extra-high density optical disc 1, the refractive index n of the extra-high density optical disc 1 is 1.622 and the refractive index N of the objective lens 20 is 1.75.

In this case, when the axial thickness of the objective lens 20 (hereinafter referred to as the thickness of the objective lens 20) t, and the focal distance f of the objective lens 20 are determined, and the first surface 20a of the objective lens 20 has a specific radius, the eccentricity tolerance between the first and second surfaces 20a, 20b is maximized with the specific radius, and the aberration increase at the time of eccentricity between the surfaces is minimized. Such objective lens 20 is also referred to as a maximum de-centering tolerance (MDCT) aplanat.

The MDCT aplanat, and the relations among the thickness of the objective lens, the refractive index, the focal distance, the numerical aperture (NA), and the disc thickness are described in detail in the following document.

M. Itonaga, F. Ito, E. Tanaka, and T. Tomita "Investigation of the General Design Principle of a Single Lens and the Development of a new NA=0.85 Single Lens", Jpn. J. Appl. Phys. 42 (2003), pp. 875 to 879.

Here, to design the objective lens 20 for the extra-high density optical disc using a relation expression described in the document, the thickness t of the MDCT aplanatic objective lens 20 was varied in a range of 1.5 mm to 3.5 mm, the focal distance f of the objective lens 20 was varied in a range of 1.5 mm to 2.75 mm, and the working distance WD1 with respect to the extra-high density optical disc 1 was calculated as shown in FIG. 7.

Furthermore, according to the document, a vertex radius of the first surface 20a of the objective lens 20 on the above-described condition, and that of the second surface 20b are uniquely determined. Here, this value is further used, and the working distance at the finite magnification in the finite correction is calculated with respect to the DVD 2, CD 3.

As a result, the working distance WD2 with respect to the DVD 2 shown in FIG. 8, and the working distance WD3 with respect to the CD 3 shown in FIG. 9 were calculated.

It was assumed that in the calculation, the above-described design conditions were satisfied with respect to the extra-high density optical disc 1 while the refractive index N of the objective lens 20 was 1.718 with respect to the second laser light L2 having a wavelength of 650 nm for the DVD 2 having a disc substrate thickness d2 of 0.6 mm, and the refractive index n of the DVD 2 was 1.58, and the refractive index N of the objective lens 20 was 1.712 with respect to the third laser light L3 having a wavelength of 780 nm for the CD 3 having a disc substrate thickness d3 of 1.2 mm, and the refractive index n of the CD 3 was 1.573.

It is assumed in this manner that the refractive index N of the objective lens 20 and the refractive index n of the disc substrate change with respect to each wavelength of the first to third laser lights L1 to L3 and that the focal distance f of the objective lens 20 also changes by each wavelength. Then, when the thickness t of the objective lens 20, and the focal distance f of the objective lens 20 are varied, the working distance WD1 of the extra-high density optical disc 1, the working distance WD2 of the DVD 2, and the working distance WD3 of the CD 3 are calculated as shown in FIGS. 7 to 9, respectively.

Moreover, the results shown in FIGS. 7 to 9 show that as the thickness t of the objective lens 20 becomes smaller and the focal distance f of the objective lens 20 becomes longer, the working distance becomes longer. Moreover, under the same condition with respect to the thickness t of the objective lens 20 and the focal distance f of the objective lens 20, such a relation is satisfied that the working distance WD1 with respect to the extra-high density optical disc 1>the working distance WD2 with respect to the DVD 2>the working distance WD3 with respect to the CD 3.

Additionally, as described above, in the optical pickup device 10A (FIG. 1) according to the embodiment of the present invention capable of handling three types of the extra-high density optical disc 1, DVD 2, CD 3, the working distance WD3 is set with respect to the CD 3 to prevent the objective lens 20 from colliding with the laser beam incidence surface 3a of the CD 3. Then, the objective lens 20 does not collide with the extra-high density optical disc 1 and DVD 2. Therefore, it is a target to secure the working distance WD3 of preferably at least 0.25 mm or more, preferably 0.3 mm or more, more preferably 0.4 mm or more with respect to the CD 3.

Moreover, in the optical pickup device 10B (FIG. 2) according to the modification capable of handling two types of the extra-high density optical disc 1, DVD 2, the working distance WD2 is set with respect to the DVD 2 to prevent the objective lens 20 from colliding with the laser beam incidence surface 2a of the DVD 2. Then, the objective lens 20 does not collide with the extra-high density optical disc 1. Therefore, as described above, it is a target to secure the working distance WD2 of preferably at least 0.25 mm or more, preferably 0.3 mm or more, more preferably 0.4 mm or more with respect to the DVD 2.

Therefore, to obtain the conditions that the working distance WD2 with respect to the DVD 2 and the working distance WD3 with respect to the CD 3 can be secured at 0.4 mm or more, 0.3 mm or more, or 0.25 mm or more, the calculation result of the working distance WD2 with respect to the DVD 2 shown in FIG. 8, and that of the working distance WD3 with respect to the CD 3 shown in FIG. 9 are used and the working distances WD2, WD3 each of 0.4 mm or more, 0.3 mm or more, 0.25 mm or more are plotted on a coordinate with a abscissa indicating the focal distance f of the objective lens and an ordinate indicating the thickness f of the objective lens. As a result, the conditions for securing the working distance WD2 with respect to the DVD 2 and the working distance WD3 with respect to the CD 3 are obtained as shown in FIGS. 10 and 11.

Moreover, as apparent from FIGS. 10, 11, it has been understood that when the plotted points are connected, the working distances WD2, WD3 each of 0.4 mm or more, 0.3 mm or more, 0.25 mm or more substantially form a straight line, and thus linear relations appear.

Additionally, to obtain the working distances WD2, WD3 each of 0.45 mm or more, 0.3 mm or more, 0.25 mm or more by the finite correction method, a relation which has to be satisfied by the thickness t and the focal distance f of the objective lens 20 is obtained deriving a regression expression based on FIGS. 10, 11. Then, a linear equation expressed by the following expression (5) is established, and the coefficient a, constant b in the expression (5) are obtained for each of the target values (0.45 mm or more, 0.3 mm or more, 0.25 mm or more) of the working distances WD2, WD3 with respect to the DVD 2, CD 3:

$$t < a \cdot f + b \quad (5)$$

wherein t: an axial thickness of the objective lens,
f: a focal distance of the objective lens,
a: a coefficient, and
b: a constant.

(1) Conditions for satisfying the working distance WD2>0.4 mm with respect to the DVD 2 (shown as mark ◇ in FIG. 10)
a=2.15, and
b=−1.62.

(2) Conditions for satisfying the working distance WD2>0.3 mm with respect to the DVD 2 (shown as mark □ in FIG. 10)
a=2.23, and
b=−1.5.

(3) Conditions for satisfying the working distance WD2>0.25 mm with respect to the DVD 2 (shown as mark Δ in FIG. 10)
a=2.28, and
b=−1.45.

(4) Conditions for satisfying the working distance WD3>0.4 mm with respect to the CD 3 (shown as mark ◇ in FIG. 11)
a=2.02, and
b=−1.94.

(5) Conditions for satisfying the working distance WD3>0.3 mm with respect to the CD 3 (shown as mark □ in FIG. 11)
a=2.08, and
b=−1.84.

(6) Conditions for satisfying the working distance WD3>0.25 mm with respect to the CD 3 (shown as mark Δ in FIG. 11)
a=2.11, and
b=−1.77.

As apparent from the condition expressions for obtaining the respective working distances WD2, WD3, with the application of the finite correction method, the working distance WD2 with respect to the DVD 2 is longer than the working distance WD3 with respect to the CD 3. Then, when the CD 3 satisfies the targeted working distance WD3 under the conditions (4) to (6), a sufficient working distance WD2 can be secured for the DVD 2.

Additionally, the above argument is an approximate one, and some supplementary descriptions are preferable as follows.

(a) Focal Position of Objective Lens 20

In the argument, considerations are made assuming that an image point is in a paraxial focal plane. In actual, the sphere aberration is minimized in a best image plane position. There is some distance between the positions, but the distance is about 10 microns at maximum. Therefore, the amount is smaller than the presently argued working distance, and is ignorable.

(b) Wavelength Scattering of Refractive Index of Objective Lens 20

In the argument, it is assumed that the refractive index is set with each of the wavelengths of the first to third laser lights L1 to L3. Even when the refractive index itself differs, the working distance of the objective lens 20 designed in MDCT aplanat is constant, and the result is not influenced. However, the change by the wavelength differs dependent upon a glass material of the objective lens 20. Needless to say, the numerical value changes dependent upon the glass material, but this influence is about 10 microns at most. Therefore, the amount is smaller than the presently argued working distance, and is ignorable.

(c) Objective Lens 20 other than MDCT Aplanat

In this case, the working distance itself changes. However, a degree by which the sphere aberration can be corrected by the finite correction is substantially equal to that in the aplanatic objective lens 20. When the objective lens 20 is designed such that it is not aplanatic, a correction force changes. However, the objective lens 20 whose characteristics are designed to be remarkably different from the aplanatic characteristics cannot be allowed in view of off-axis characteristics of the objective lens 20. Therefore, it is difficult to increase the change of the working distance by the difference of the design in the objective lens 20. To satisfy the above-described ranges of the condition expressions is still an indispensable condition for securing the working distance.

(d) Objective Lens 20 having Meniscus Shape

The above argument is made with the axial working distance of the objective lens 20. Additionally, when the objective lens 20 is thinned, an MDCT aplanatic lens shape is sometimes a meniscus shape as shown in FIG. 12. When the objective lens 20 has a meniscus shape, the first surface 20a is a convex surface while the second surface 20b is a concave surface. Moreover, an outer circular portion 20b2 of the second surface 20b protrudes with respect to an inner circular portion 20b1 thereof, for example, toward the extra-high density optical disc 1 side. Therefore, the effective working distance shortens. Therefore, the axial working distance needs to be longer than that in the above-described conditions. Even in this case, to satisfy at least the above-described ranges of the condition expressions is still an indispensable condition for securing the working distance.

(e) Combined Method of Wavefront Aberration Correction Method and Finite Correction Method with Respect to Sphere Aberration In this case, the working distance changes dependent upon contribution ratios to sphere aberrations in both the methods. Even in this case, unless the above-described ranges are satisfied, needless to say, any necessary working distance cannot be secured.

Additionally, to uniquely determine the lower limit of the thickness of the objective lens 20 is a possibility of machining. In this sense, when the lower limit is a finite value of at least zero, there is a possibility that the design is established. Unless the first surface 20*a* of the objective lens 20 intersects the second surface 20*b*, the design is established setting aside the question of machining. Needless to say, the relation between the first and second surfaces 20*a*, 20*b* of the objective lens 20 changes with the focal distance and refractive index of the lens. Therefore, the lower limit of the thickness of the objective lens 20 can be said to be theoretically zero.

It should be understood that many modifications and adaptations of the invention will become apparent to those skilled in the art and it is intended to encompass such obvious modifications and changes in the scope of the claims appended hereto.

What is claimed is:

1. An optical pickup device which selectively records or reproduces a first optical recording medium, a second optical recording medium having a recording density lower than that of the first optical recording medium, and a third optical recording medium having a recording density lower than that of the second optical recording medium, the device comprising:

a first laser light source which emits a first laser light for the first optical recording medium;

a second laser light source which emits a second laser light having a wavelength longer than that of the first laser light for the second optical recording medium;

a third laser light source which emits a third laser light having a wavelength longer than that of the second laser light for the third optical recording medium; and an objective lens whose numerical aperture (NA) is set to 0.75 or more for the first optical recording medium and in which at least one of first and second surfaces backing on to each other is formed as an aspheric surface and which converges the first to third laser lights onto signal surfaces of the first to third optical recording mediums, the objective lens satisfying the following expression:

$$t < a \cdot f + b$$

wherein t: an axial thickness of the objective lens,
  f: a focal distance of the objective lens,
  a: a coefficient, and
  b: a constant,
  and the coefficient a and the constant b satisfies that $a=2.02$, $b=-1.94$; $a=2.08$, $b=-1.84$; or $a=2.11$, $b=-1.77$.

2. An optical pickup device which selectively records or reproduces a first optical recording medium, and a second optical recording medium having a recording density lower than that of the first optical recording medium, the device comprising:

a first laser light source which emits a first laser light for the first optical recording medium;

a second laser light source which emits a second laser light having a wavelength longer than that of the first laser light for the second optical recording medium; and an objective lens whose numerical aperture (NA) is set to 0.75 or more for the first optical recording medium and in which at least one of first and second surfaces backing on to each other is formed as an aspheric surface and which converges the first and second laser lights onto signal surfaces of the first and second optical recording mediums, the objective lens satisfying the following expression:

$$t < a \cdot f + b$$

wherein t: an axial thickness of the objective lens,
  f: a focal distance of the objective lens,
  a: a coefficient, and
  b: a constant,
  and the coefficient a and the constant b satisfies that $a=2.15$, $b=-1.62$; $a=2.23$, $b=-1.5$; or $a=2.28$, $b=-1.45$.

* * * * *